Patented July 16, 1940

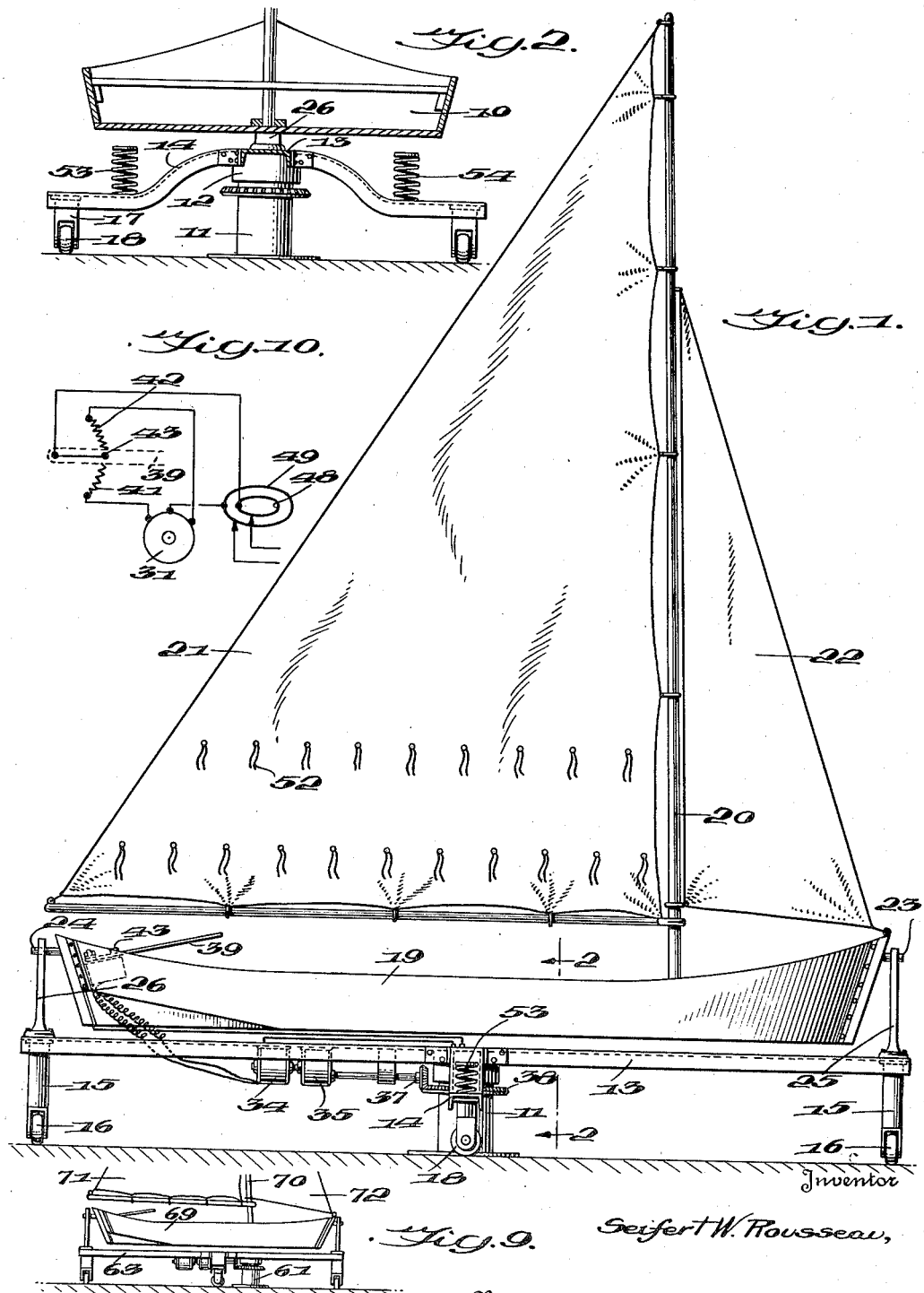

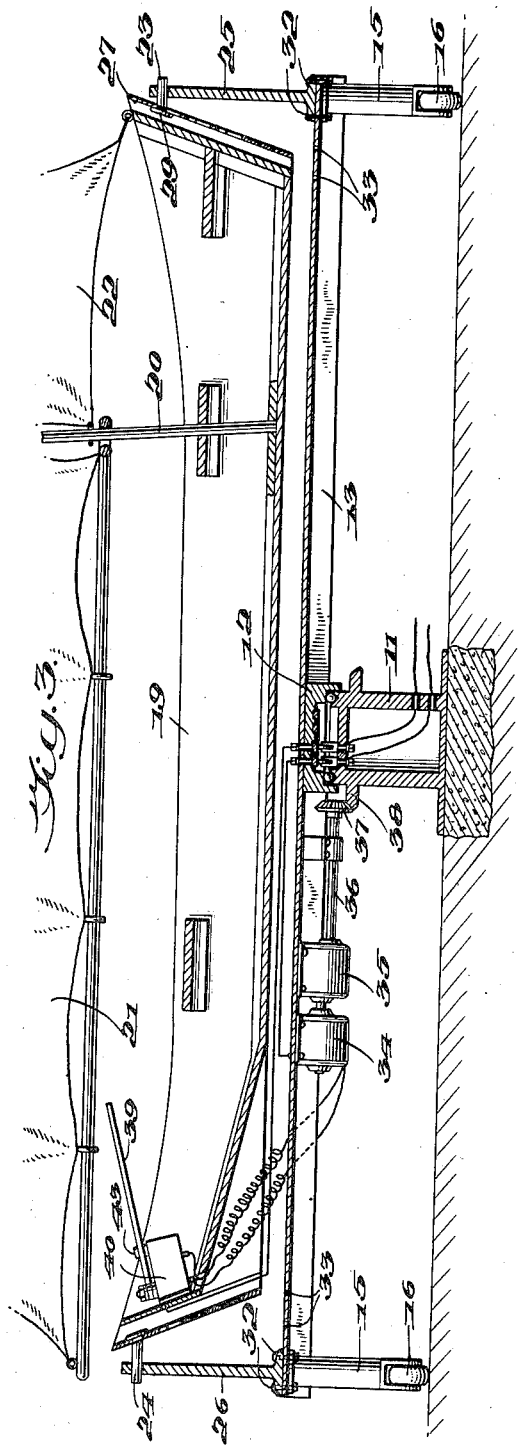

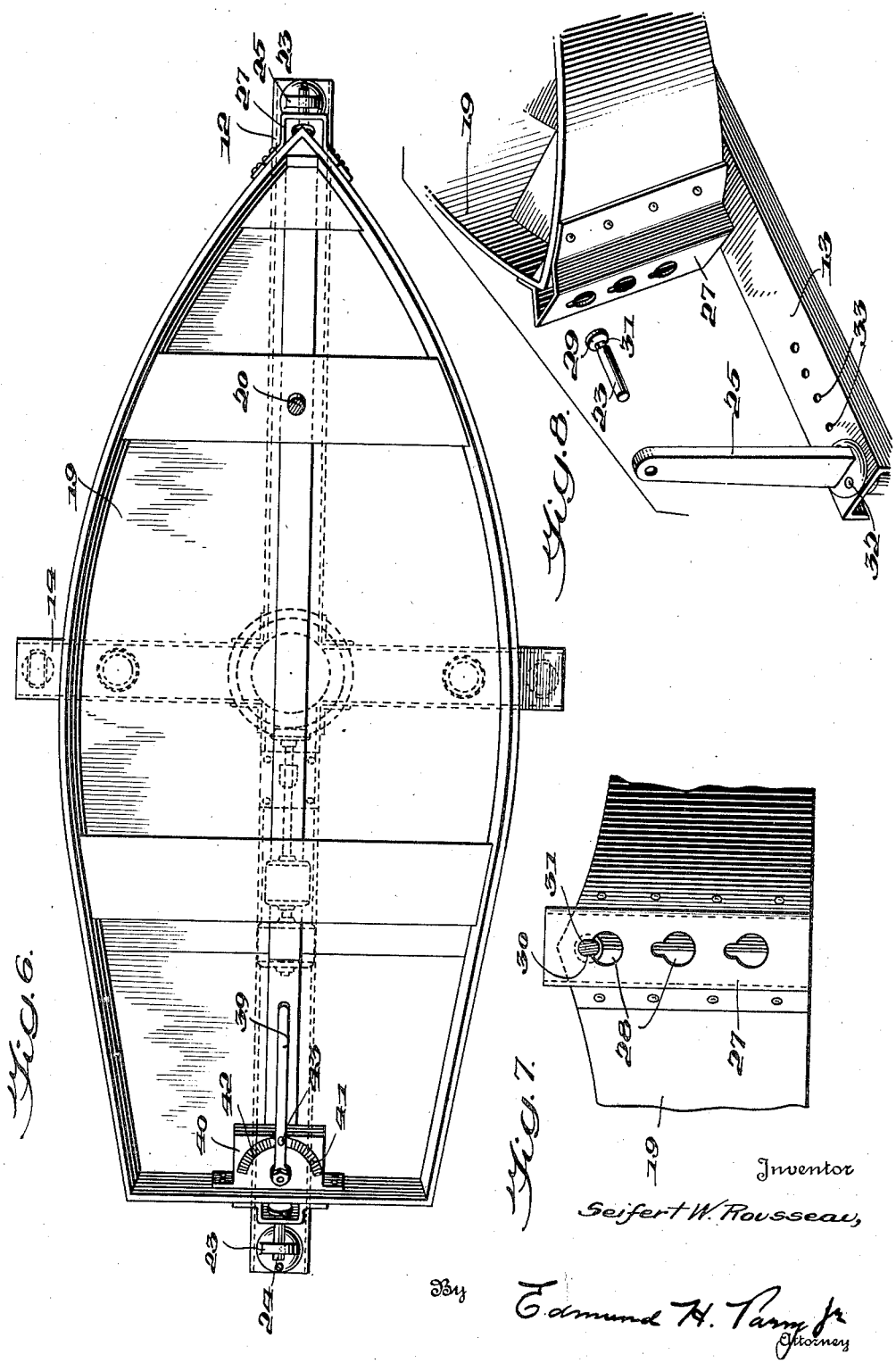

2,208,083

UNITED STATES PATENT OFFICE 2,208,083

DEVICE FOR TEACHING THE ART OF SAILING A BOAT

Seifert W. Rousseau, Port Washington, N. Y.

Application July 27, 1938, Serial No. 221,577

19 Claims. (Cl. 35—11)

This invention relates to instructional apparatus enabling a person to learn the art of sailing a boat. The invention is intended for use on land, but is so designed as to accurately reproduce the action of a boat sailing in the water.

The essential object of the invention is to provide apparatus of the character described which will be responsive to wind conditions so as to heel or tilt in accordance with the wind force and direction, and which may be turned under control of the person being instructed to represent the steering action of a rudder. The device is mounted on a stationary support in such manner as to be both tiltable and turnable under the conditions just mentioned, and the apparatus can be tacked, jibed, swung into the wind, "sailed" with the wind, caused to heel to greater or less degree, etc., all in accordance with the handling of the person being instructed.

A further object of the invention is to provide an apparatus which is subject to movement both by wind and a mechanical operating device controlled by the person being instructed so that the condition of the apparatus at any time depends on both these factors. The device will immediately respond to the handling of the person being instructed and will behave in accordance with the good or bad judgment exercised.

The invention consists in the provision of a body member, which may or may not be an actual small boat, provided with a sail and mounted for tilting movement about a horizontal longitudinal axis. The body member is also mounted for turning movement in both directions about a stationary vertical axis, and reversible motor means are provided regulatable through a control member by a person in the body member.

Various detailed features providing for adjustment of the apparatus to suit any desired conditions, and others contributing towards the production of good operation under all conditions will become apparent from the illustrative embodiment of the invention shown in the accompanying drawings and hereafter to be described.

In the drawings:

Fig. 1 is a side elevation of one form of the complete apparatus;

Fig. 2 is a transverse section taken on line 2—2 of Fig. 1;

Fig. 3 is a longitudinal section corresponding to the view shown in Fig. 1;

Fig. 4 is an enlarged vertical section illustrating the details of certain parts shown in Fig. 3;

Fig. 5 is a top plan view corresponding to Fig. 4;

Fig. 6 is a top plan view corresponding to Fig. 1, but with the sail omitted;

Fig. 7 is a detailed view of the front end of the body member;

Fig. 8 is a perspective view of the front end of the body member and showing in disassembled condition the means for adjustably and pivotally supporting the same;

Fig. 9 is a more or less diagrammatic view similar to Fig. 1 of a modified form of the invention; and, Fig. 10 is a wiring diagram to supplement the showing in Figs. 1 and 3.

The apparatus includes a circular stationary base member 11 set in concrete or otherwise anchored to a suitable support, and which is preferably hollow as shown in Figs. 3 and 4. A frame is rotatably supported for turning movement on the base member around the vertical axis thereof. In the present case the frame is in the form of a cross, best shown in Fig. 6, and comprises a relatively long main frame member 13 fixed to the head member 12 journaled for rotation on base member 11 and a cross member 14 projecting out on each side of the longitudinal member at the base member. As best shown in Fig. 2 the opposite arms of the cross member 14 are offset downwardly for reasons which will hereafter become evident. Posts 15 carrying rollers 16 are provided at the opposite ends of the frame member 13 to support the same for rotation about the base member. Similar but shorter posts 17 carrying rollers 18 as shown in Fig. 2 are provided at the opposite ends of the cross member 14.

Mounted on the frame for rotation therewith and so as to be capable of tilting movement about a longitudinal axis is a body member 19, carrying a mast 20, mainsail 21 and jib 22. In the present case the body member is shown in the form of a small sailing skiff, but it will be understood that while the use of an actual boat is desirable for purposes of realism the body member may take some other form, although in all cases some sort of a sail or sails will be employed for purposes of the invention.

The body member is raised above the supporting frame and is pivotally mounted so as to be tiltable transversely thereof under the action of the wind on the sails according to the force and direction thereof. In the present case pivot studs or shafts 23 and 24 are secured to the front and rear ends of the body member journaled in supporting posts 25 and 26 at the opposite ends of main frame member 13. It is desirable that the horizontal tilting axis of the body member as represented by studs 23 and 24 shall be vertically adjustable to vary the position of the axis to different distances above the center of gravity of the body member. In this way the sensitivity of the body member to heeling over, or tilting under any given wind conditions, can be varied to suit the weight of the person to be instructed who sits in the body member. Any suitable arrangement for raising and lowering the pivot studs at the ends of the body member may be employed. One such arrangement is shown by way of example in Figs. 7 and 8. In such case a metal channel member 27 is secured to the front end of the body member provided with a series of vertically spaced holes 28 through which the head 29 of pivot stud 23 is insertable. As best shown in Fig. 7 the holes are provided with a restricted upper portion 30 adapted to fit the recessed neck portion 31 of the stud so as to firmly secure the same in horizontal position. As best shown in Fig. 3, head 29 must be disposed at an angle to the axis of stud 23 by reason of the inclination of the front end of the body member and channel member 27. A similar adjustable arrangement at the rear end of the body member is employed for pivot stud 24. Through this arrangement the tilting axis of the body member may be raised and lowered relative thereto, and incidentally such adjustment will raise and lower the position of the body member relative to the supporting frame.

By reason of the inclination of the ends of the body member it will be evident that when the studs are inserted in lower holes of the channel member they will be closer together. It is therefore desirable that one or both of the supporting posts 25, 26 be mounted on main frame member 13 for adjustment lengthwise thereof so that their spacing may be decreased to properly journal the studs under the conditions just mentioned. In Fig. 3 post 26 is shown as being adjustably secured through bolts 32 which may be inserted in any of the series of holes 33 in different adjusted positions lengthwise of frame member 13.

The body member is "steered" by the person seated therein by causing the supporting frame to turn on base 11 through the use of motor means. The motor is indicated at 34 in Figs. 1 and 3. In the present case such motor is mounted on the underside of the frame member 13 and operates through a reduction gear 35, shaft 36 and bevel gears 37 and 38 to rotate the frame member. The motor 34 should be of the reversible type. A reduction gear is desirable so that rotation will be relatively slow and accurately represent the response of a sailboat to a rudder. In the latter connection it may be stated that the arrangement is preferably such that the turning speed in either direction should be variable within range of from 2 to 15 revolutions per minute.

The control for the motor comprises a tiller member 39 pivotally mounted at the rear of the body member on a suitable support 40. Such support carries two arcuate electric rheostats 41 and 42 slightly spaced from each other at their inner ends. An electric contact 43 on the tiller member under movement of the latter to the right works over rheostat 41, and under movement to the left works over rheostat 42.

Since both the motor and control member just referred to are both rotatable with the frame it is best to provide an arrangement such that current from any suitable source can be supplied without regard to how many times the frame is rotated in one direction or another. In Figs. 3 and 4 the power lines 44 and 45 are shown as entering the supporting base 11 and connecting with spaced brush contacts 46 and 47 which wipe against contact rings 48 and 49 secured to the underside of rotatable head 12. Current is taken off from the respective rings through posts 50 and 51. As schematically represented in Fig. 3 one of the posts is connected with the reversible motor, and the other post with contact 43 of the tiller member 39. The outer ends of the rheostats 41 and 42 are connected to the other two terminals of the reversible motor. By reference to the wiring diagram in Fig. 10 the actual connections may be better understood. The wiring with respect to the motor is such that movement of the tiller member 39 to the right will make a circuit through the entire resistance of rheostat 41 and cause the motor to very slowly rotate the frame and the body member in a counterclockwise direction, representing turning of a boat to the starboard. As the tiller member 39 is moved farther to the right the electrical resistance of rheostat 41 will gradually be reduced and the frame will be rotated by the motor at an increasing speed up to a limit of about 15 R. P. M. Movement of tiller member 39 to the left will set up a circuit through resistance 42, causing the motor to rotate in the opposite direction and turn the frame member in a clockwise direction, representing turning of a boat towards the port side.

With the arrangement described the body member 19 will tilt over to a varying degree depending on the strength and direction of the wind. By turning the tiller member 39 to either the right or the left the body member may be turned to change the position of the sails with reference to the direction of the wind. Obviously the more the body member is turned into the wind the less will be the action of the wind on the sails and the less the tilting of the body member. When the body member is turned across the wind it will obviously tilt to a greater degree. Suitable block and rope tackle representing the main sheet for controlling the mainsail 21 will be provided, so that the mainsail may swing from one side to the other to a varying degree under control of the occupant. Thus, tacking and jibing may be practiced, and the occupant may also acquire experience in determining how far the mainsaid should be taken in or let out in accordance with varying positions of the body member with reference to the direction and strength of the wind. Similar tackle will be provided for the jib. All of such tackle has been omitted from the drawing for purposes of clarity, but its arrangement will be understood by anyone familiar with saidboats. It will be noted that reef points 52 may be in several series on the mainsail 22 so that the sail may be reefed in case of a strong wind.

To prevent injury or strain to the apparatus, and prevent jar of the occupant in the case of jibing or tacking too quickly, and further to serve to limit and cushion tilting of the body member 19 on its supporting frame, it may be desirable to provide cushion members 53 and 54 on the opposite depressed arms of the cross frame member 14 as shown in Fig. 2. The depressed arrangement of the arms serves to permit a substantial degree of tilting of the body member to either side. After tilting to a certain degree the body member will contact one or the other of the cushions which, as here shown, comprises coil springs.

In the embodiment of the invention which has been described it will be noted by reference to Figs. 1 to 3 that the supporting base 11 is positioned substantially at the midpoint of long frame member 13, and that mast 20 of the body member is located substantially forward of the base member. This means that the mast, about which the mainsail turns will not coincide with the turning axis. The coincidence of the mast with the turning axis is calculated to provide improved handling of the apparatus and according to an improved embodiment illustrated diagrammatically in Fig. 9 the mast may be vertically aligned with the turning axis. In such embodiment 61 indicates the supporting base 63 the frame which turns about the base, 69 the body member, 70 the mast, and 71 and 72 the mainsail and jib. It will be noted that the mast 70 is in vertical alignment with base member 61. The mast 70 may be positioned in body member 69 somewhat rearwardly as compared with the relationship of the corresponding portions of the construction previously described. The supporting base is located somewhat forwardly of the midpoint of the long frame member 63, as it is by no means necessary that the frame should turn about its midpoint as in the case of the previous construction.

It will be evident that the invention is well calculated to teach all phases of sailing a boat. Additionally the same has an amusement value. While the invention is primarily intended for use out-of-doors so that advantage may be taken of natural wind conditions it can, of course, be used indoors by creating an artificial wind through the use of a large power driven blower. It will be understood that the form of the invention herein illustrated and described is merely illustrative, and that various changes and modifications within the principles of the invention may be employed without departing therefrom. The scope of the invention is therefore to be determined according to the appended claims.

I claim:

1. An instructional device comprising a stationary base member, a body member mounted on said base member for turning movement on a fixed vertical axis and tilting movement about a horizontal axis, and sail means upstanding from the body member actuatable by air currents to tilt the body member about said horizontal axis.

2. An instructional device comprising a stationary base member, a body member mounted on said base member for horizontal turning movement on a fixed vertical axis and tilting movement on a horizontal axis, sail means on the body member upstanding about the tilting axis actuatable by air currents to tilt the body member about said horizontal axis, and means for effecting horizontal turning of the body member on the base member.

3. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, and reversible motor means for effecting horizontal turning of the body member on the base member in both directions about its turning axis.

4. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, reversible motor means for effecting horizontal turning of the body member in both directions about its turning axis, and control means on the body member for said reversible turning means.

5. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, means for horizontally turning the body member at varying speeds about its turning axis, and speed control means on the body member for said turning means.

6. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, reversible motor means for effecting horizontal turning of the body at varying speeds in both directions about its turning axis, and control means on the body for reversing and for varying the speed of the motor means.

7. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, a pivoted control member on the body member, and means controlled by movement of said control member for horizontally turning the body member about its turning axis.

8. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, reversible motor means for turning the body member about its turning axis, a control arm on the body member movable in a direction to cause the motor means to turn the body member in one direction and reversely movable to cause the motor means to turn the body member in the opposite direction.

9. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, a reversible electric motor for turning the body member about its turning axis, a control member in the body member carrying an electric contact element, a pair of electric rheostats connecting with and controlling rotation of the motor in reverse directions, said control member upon movement in one direction through its contact element making contact with one rheostat to cause the motor to rotate in one direction and upon movement in the reverse direction making contact with the second rheostat to cause the motor to rotate in the other direction.

10. An instructional device comprising a stationary base member, a body member mounted on said base member for horizontal turning movement on a fixed vertical axis and tilting movement on a horizontal axis, sail means upstanding from the body member actuatable by air currents to tilt the body member about said horizontal axis, motor means for turning the body member about its turning axis, control means for the motor means, and a reduction gearing for causing the motor means to turn the body member at very slow speed.

11. An instructional device including a stationary supporting member, a body member comprising or simulating a boat body mounted on said base member, for tilting movement about a horizontal axis extending lengthwise thereof and for rotational movement about a fixed vertical axis located at a point intermediate the front and rear ends of the body member, a mast upstanding from the body member, sail means supported by the mast actuatable by air currents to tilt the body member about said horizontal axis, reversible motor means for turning the body member in both directions about its vertical turning axis, a tiller member in the rear portion of the body member, and control means for the motor responsive to movement of the tiller member.

12. An instructional device comprising a base member, a frame member mounted for horizontal rotation on the base member, a body member supported by and tiltable on the frame about a horizontal axis, and sail means upstanding from the body member actuatable by air currents to tilt the body member about said horizontal axis.

13. An instructional device comprising a base member, a frame mounted for horizontal rotation on the base member, a body member supported by and tiltable on the frame about a horizontal axis, sail means upstanding from the body member actuatable by air currents to tilt the body member about said horizontal axis, and means for effecting turning of the frame on the base member.

14. An instructional device comprising a base member, a frame mounted for horizontal rotation on the base member, spaced supporting members on the frame, a body member carrying sail means, pivot means at the front and rear ends of the body member journaled in the spaced supporting members and mounting the body member for tilting movement on the frame, said sail means being actuatable by air currents to effect the tilting movement of the body member on the frame, and means for effecting turning of the frame on the base member.

15. An instructional device comprising a base member, a frame mounted for horizontal rotation on the base member, spaced supporting members on the frame, a body member, pivot means at the opposite ends of the body member adjustable vertically relative to the body member, said pivot means being journaled in the spaced supporting members and suspending the body member for tilting movement on the frame about a horizontal axis determined by the adjustment of the pivot means, said means actuatable by air currents to cause said tilting movement of the body member, and means for effecting turning of the frame on the base member.

16. An instructional device comprising a base member, a frame mounted for horizontal rotation on the base member, a body member, means on the frame supporting the body member for tilting movement of the body member about a horizontal axis, means for vertically adjusting the body member relative to the tilting axis, sail means actuatable by air currents to cause said tilting movement of the body member, and means for effecting turning of the frame and tilting of the body member.

17. An instructional device comprising a base member, a frame mounted for horizontal rotation on the base member, a body member supported by the frame for lateral tilting movement, a mast upstanding from the body member at a point forward of the base member, sail means supported by the mast actuatable by air currents to cause lateral tilting movement of the body member, and means for effecting turning of the frame on the base member.

18. An instructional device comprising a base member, a frame mounted for horizontal rotation on the base member, a body member supported by the frame for lateral tilting movement, a mast upstanding from the body aligned with the turning axis of the frame, sail means supported by the mast actuatable by air currents to cause lateral tilting movement of the body member, and means for effecting turning of the frame on the base member.

19. An instructional device comprising a horizontal frame, a central base member supporting the frame for turning movement about a vertical axis, roller means supporting the ends of the frame, a body member comprising a boat-like body carrying a sail, said body member being supported by the frame for lateral tilting movement and for turning movement with the frame, said sail being actuatable by air currents to cause lateral tilting movement of the boat-like body member, means for turning the frame, and control means in the body member for the turning means.

SEIFERT W. ROUSSEAU.